Figure 1:
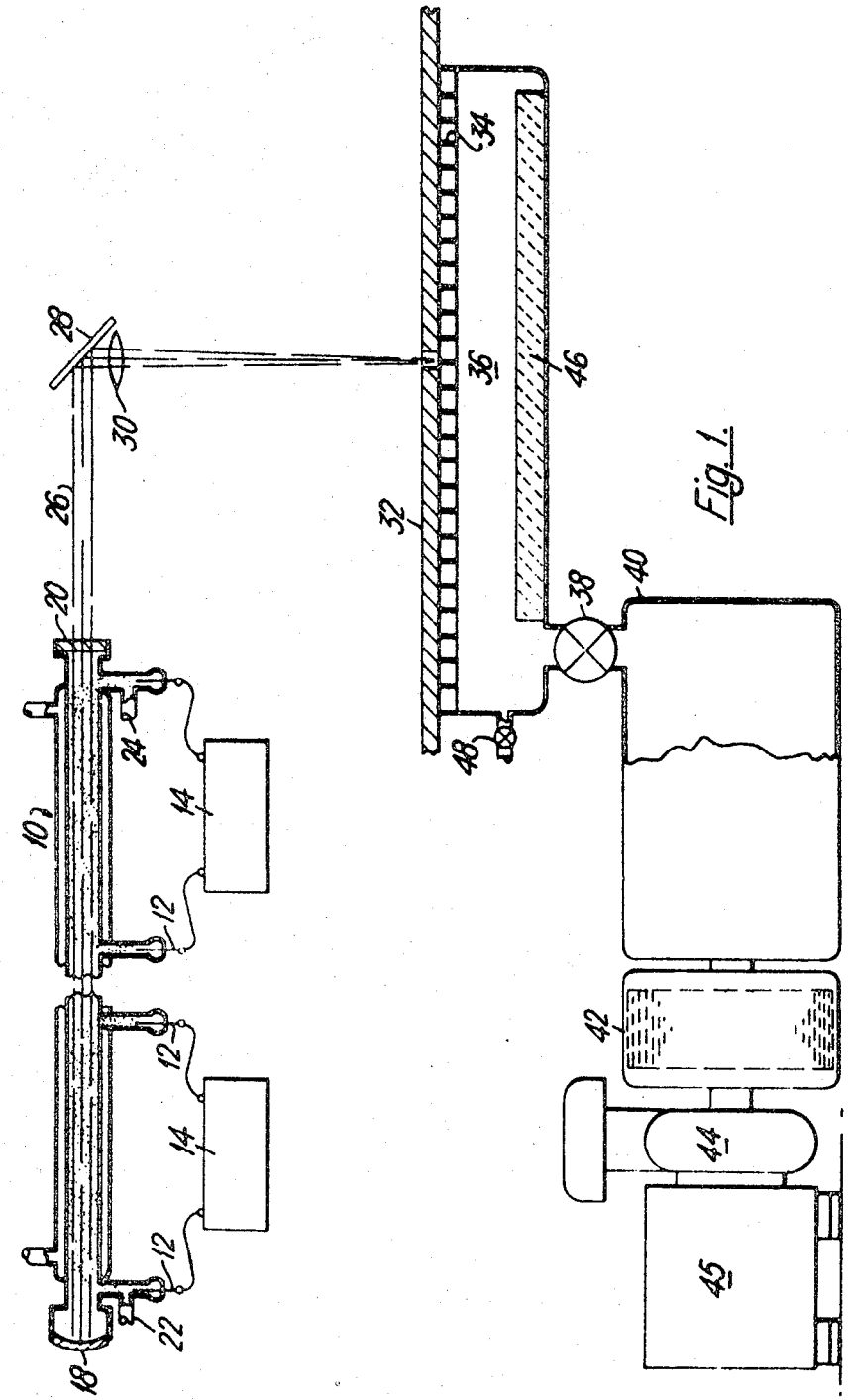

United States Patent

[11] 3,612,814

| | | |
|---|---|---|
| [72] | Inventor | Peter T. Houldcroft<br>Royston, England |
| [21] | Appl. No. | 948 |
| [22] | Filed | Jan. 6, 1970 |
| [45] | Patented | Oct. 12, 1971 |
| [73] | Assignee | National Research Development Corporation<br>London, England |
| [32] | Priority | Jan. 10, 1969 |
| [33] | | Great Britain |
| [31] | | 1578/69 |

[54] CUTTING PROCESSES EMPLOYING A LASER
9 Claims, 5 Drawing Figs.

[52] U.S. Cl. .................................................. 219/121 L
[51] Int. Cl. .................................................. B23k 9/00
[50] Field of Search ....................................... 219/121 L,
121 EB, 68, 69, 70

[56] References Cited
UNITED STATES PATENTS
3,067,358  12/1962  De Maine ..................... 219/69 X
3,204,076  8/1965  Browning ..................... 219/75

OTHER REFERENCES
" Gas-Jet Laser Cutting," British Welding Journal, August 1967, by A. B. J. Sullivan & P. T. Houldcroft Primary Examiner—J. V. Truhe
Assistant Examiner—Lawrence A. Rouse
Attorney—Kemon, Palmer & Estabrook ABSTRACT: A workpiece is cut by causing a focused spot from a laser beam to travel over its surface and a suction chamber is located on the other side of the workpiece with an opening under the cutting location so that air or other gas is drawn through the cut into the suction chamber, taking with it fumes and products of distillation. The opening in the suction chamber may be a grid supporting the workpiece. For metal workpieces a gas having an exothermic reaction with the metal can be drawn through the cut.

Inventor
Peter T. Nondercroft
By
Kinman, Palmer & Estabrook
Attorneys

CUTTING PROCESSES EMPLOYING A LASER

This invention is concerned with the cutting of materials by means of a focused laser beam.

In our copending application Ser. No. 712,782 we have described a method of cutting metals by means of a laser, in which a jet of an exothermically reacting gas (for example, oxygen) was directed at the point on the workpiece at which the laser beam was aimed. To make a cut in the workpiece the oxygen jet and the laser beam were moved over the workpiece together. We found that it was advantageous to cause the oxygen to flow towards the workpiece from a nozzle through which the laser beam passed.

Although the present invention is applicable to processes in which a metal is cut by a laser in the presence of an exothermically reactive gas, it will probably have its principal application in the cutting of materials which do not require an exothermic reaction to assist the laser. For some of these materials it is nevertheless advantageous to cause a stream of air to flow in the region of the cut.

In the method according to the present invention, a suction chamber is initially located in the path of the laser beam so that an opening in the chamber is in the said path; the workpiece is then placed so that the part of the workpiece to be cut is adjacent to the suction chamber, between the laser beam and the suction chamber; and, when a cut is commenced by the laser beam, air or other gas is drawn through the cut into the suction chamber; the intersection of the laser beam and the workpiece is caused to follow a path to be cut on the workpiece by relative movement of the workpiece and the laser beam. Thus, when material such as cloth, timber or paper is cut by means of a laser, the products of distillation and the fumes are sucked through the cut into the chamber. Here they can be removed by a filter in the suction line. This removes the contamination of the atmosphere which would otherwise be a serious disadvantage when cutting such materials.

An additional advantage obtained when cutting flexible material, for example paper and cloth, supported on a gridlike support, is that the material is held and flattened against the support by the suction and this assists in the achievement of a consistent quality of cut. In addition, a laser which can be used without a travelling nozzle to direct air or other required gas at the beam focus on the workpiece can be moved much more quickly and easily; for small movements of the beam, it is only necessary to deflect a mirror in its path. For larger movements a mirror and a lens between the laser and the workpiece are moved together but this is still easier than moving a head with a connection to a gas supply.

For materials which require an exothermic reaction for satisfactory cutting, for example steel workpieces, an oxygen atmosphere can be created above the required line of cut in a pot or hood and a stream of the gas can then be made to flow through the cut by the suction from the underlying chamber, the gas stream taking with it any debris which results from the cutting.

Figure 2:
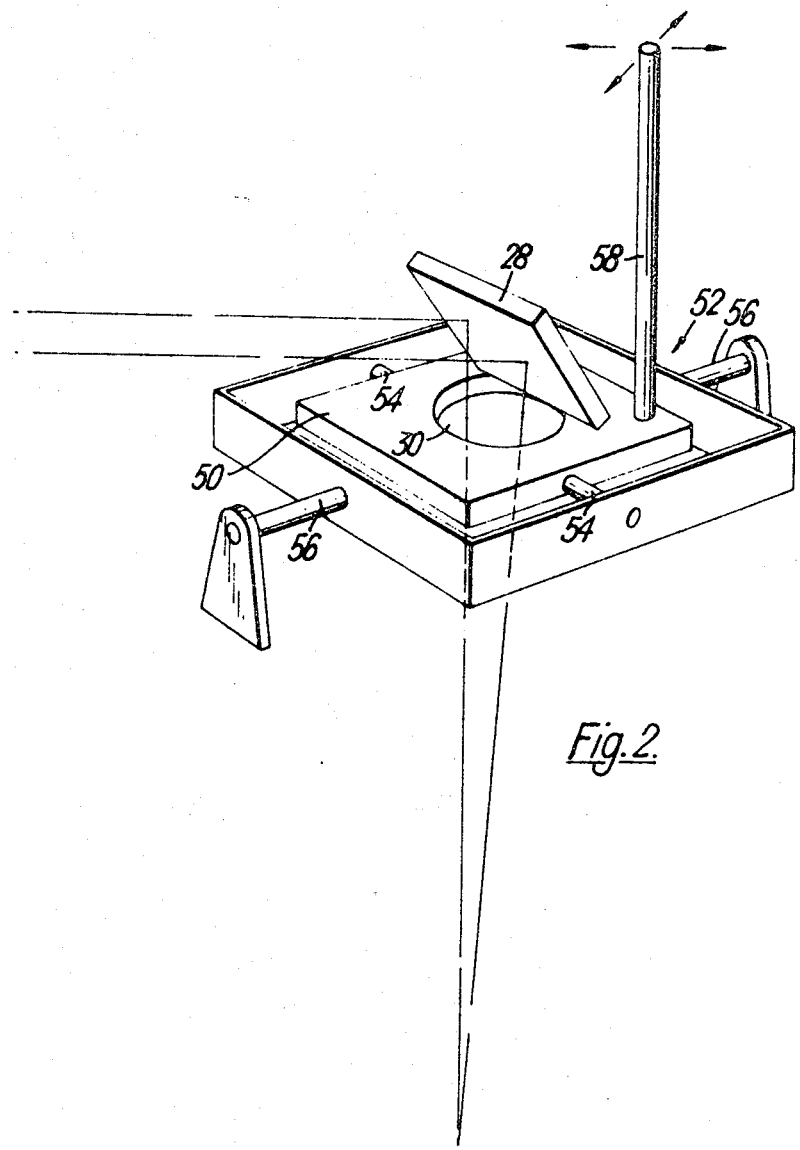
Figure 3:
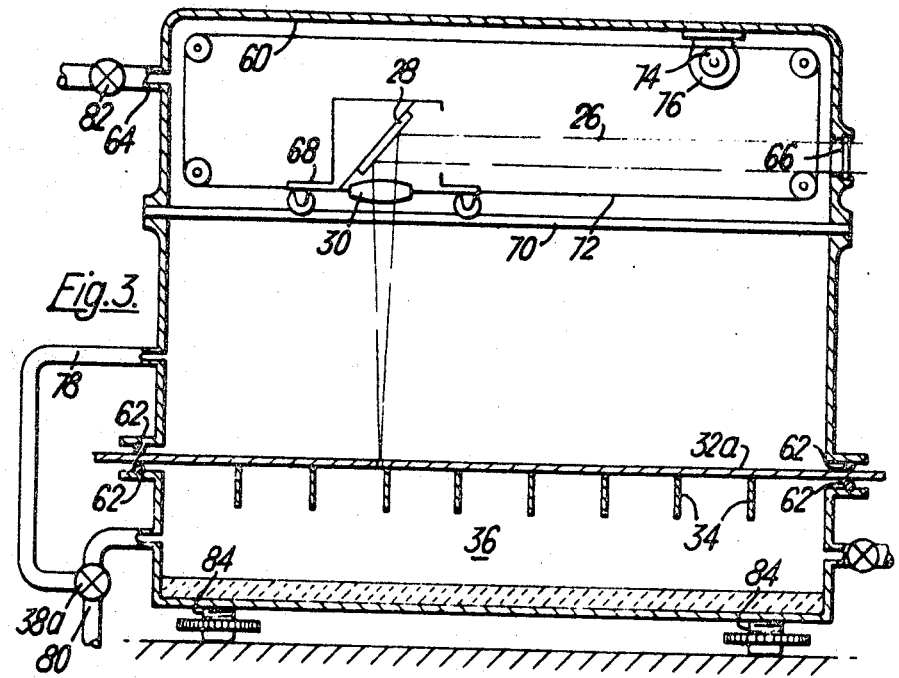
Figure 4:
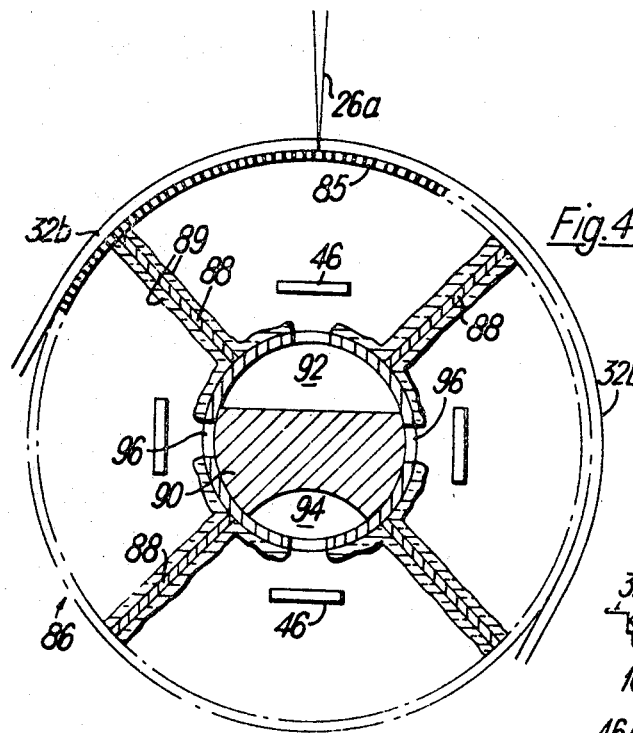
Figure 5:
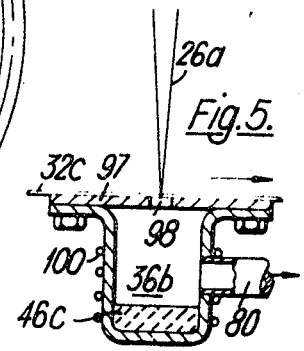

In order that the invention may be better understood, two examples of apparatus for carrying the invention into effect will now be described with reference to the accompanying drawings. In the drawings:

FIG. 1 shows apparatus for cutting nonmetallic material;
FIG. 2 illustrates a method of moving the mirror of FIG. 1;
FIG. 3 shows a modification of the apparatus of FIG. 1 for cutting a metal requiring the presence of an exothermically reactive gas.
FIG. 4 illustrates a rotary support for the workpiece; and
FIG. 5 illustrates diagrammatically a modification in which the laser beam is stationary.

The laser 10 shown in FIG. 1 is of the carbon dioxide-nitrogen-helium type but it will be realized that other types of laser can be used equally well. The laser shown has a length of 10 meters and a bore of 30 millimeters and there are five sections to the tube, of which only two are shown in the diagram. Each section has its own electrodes 12 and its own electrical supply 14. The power supply provides 20 kv. for striking and 9 kv. at 45 ma. when the laser is running. The laser body has a fully reflecting concave mirror 18 of gold-surfaced stainless steel at one end and a plain semireflecting germanium disc 20 at the other end. The concave mirror 18 has a focal length slightly in excess of 10 meters. The gas in which the discharge is to be created flows into the laser body through the inlet 22 and out from the laser body through the outlet 24.

When the laser is in operation a substantially parallel beam of coherent light emerges from the laser through the disc 20.

The emergent beam 26 is reflected by an aluminized mirror 28 through a lens 30 on to a workpiece 32, which may be a sheet of cloth, for example. The workpiece is supported on a grid 34 constituted from narrow strips of metal with their edges supporting the material to be cut. The grid 34 forms the top of a chamber 36 which is connected through an isolating valve 38 to a reservoir 40. The reservoir 40 communicates through a filter 42 with a suction pump 44 driven by a motor 45. A firebrick layer 46 in the chamber 36 absorbs the energy of the laser beam which passes through the cut. A valve 48 permits the chamber 36 to be exhausted to air when the cutting operation is completed.

Before a cutting operation takes place, with the valve 48 closed and the valve 38 open the workpiece is placed on the grid and the chamber 36 is exhausted by the pump. During the cutting operation because the cut is narrow it is relatively easy to pump the chamber at the required rate. Also, because only the laser beam has to be moved above the workpiece it is now easier to cut complicated shapes quickly. When the desired cut has been made the isolating valve 38 is closed so that when the workpiece is removed the vacuum will be retained in the reservoir 40. A fresh workpiece is placed on the grid, the isolating valve 38 is opened, the chamber 36 is exhausted and the next cutting operation commences.

In addition to the materials mentioned above, plastic and leather can be cut satisfactorily by a method embodying the present invention.

FIG. 2 shows diagrammatically a method of moving the mirror and lens which is satisfactory when only a limited movement is required. The mirror 28 is fixed to support 50 which is mounted on gimbals 52 including pivots 54 and 56. A control rod 58 is fixed to the support 50 off the axes of the pivots 54 and 56. Movement of the control rod causes angular movement of the support 50 and therefore of the lens 30 and mirror 28.

As indicated above, the suction chamber arrangement can also be used in processes employing exothermically reacting gas, for example a cutting process in which oxygen is used to assist the cutting of a steel plate by a laser beam. The suction chamber is particularly advantageous if a noxious exothermically reacting gas has to be used, for example chlorine.

FIG. 3 shows a modification of FIG. 1 in which a stationary hood 60 is located above the suction chamber 36. A metal workpiece 32a passes between the chamber 36 and hood 60 on a grid 34. Seals 62 between the workpiece and hood and between the workpiece and the suction chamber are provided at the margins of the hood and suction chamber. The hood 60 has a connection 64 to an oxygen supply. It also has a window 66 permitting the passage of the laser beam 26. The mirror 28 and lens 30 are mounted within the hood on a carriage 68 which can be moved along rails 70 by means of a wire 72 driven by means of a capstan 74 and motor 76. This permits movement of the laser beam over the workpiece in a direction parallel to the rails.

As in the apparatus of FIG. 1, the suction chamber 36 is connected to an isolating valve. In this case the isolating valve 38a is a three-way valve having a connection 78 to the chamber formed by the hood 60. When a workpiece has been placed in position, the isolating valve 38a is set to permit the hood 60 to be evacuated by means of the pump connected to pipe 80. Thereafter the valve 38a is set to its working position in which the chamber 36 is evacuated. A valve 82 is opened to flood the hood 60 with oxygen and the cutting process then commences. During this process a stream of oxygen is drawn through the cut, made by the laser, by the suction in the chamber 36. Threaded feet 84 permit vertical adjustment of the apparatus. If the cut to be made is not a straight line, the workpiece can be moved in a direction perpendicular to the plane of the paper.

A buffer layer of a nonmetallic material may advantageously be arranged between a metal workpiece and the support members of the metallic grid to prevent the transfer of metal from the workpiece to the grid.

In a further arrangement shown in FIG. 4, the gridlike support forms the circumferential surface 85 of a rotary member in the form of a drum 86, the interior of which is divided by walls 88 into segments, the walls 88 having a coating 89 of a ceramic material deposited by spraying. During the rotation of the drum, the circumferential surface moves progressively through the working position under the laser beam 26a. A stationary shaft 90 is cut away on one side to form a chamber 92 which is connected to a suction pump (not shown). On the other side, the shaft 90 is cut away to form a chamber 94 which is open to the atmosphere. Each segment has a port 96 on its inner wall. It will be seen that as each segment performs one revolution, it is connected through the port 96 and chamber 92 to the suction source for the period in which any part of that segment is located below the laser beam 26a. Shortly after the trailing edge of the segment has moved out of the working position, the port 96 is brought into communication with the chamber 94 and the segment is filled with air. This enables a workpiece 32b which has been carried round with the drum to be released from the periphery of the drum. In this example the firebrick layers 46 are mounted in the segments and rotate with the latter. With a stationary laser beam, a linear cut will be made on the workpiece, air being drawn through the cut into the working segment of the drum. To cut a pattern, the laser beam 26a is moved in a direction perpendicular to the plane of the paper.

With the modified apparatus shown in FIG. 5, during the cutting process the material 32c to be cut is moved continuously over a support 97 constituting the top of a small stationary suction chamber 36b. The laser beam 26a is also stationary and meets the material 32c above a hole 98 in the support 97. The chamber 36b has a connection 80 to the suction pump and has a layer of firebrick 46c in its place. In addition, it has a water-cooling coil 100 around its periphery to remove some of the heat developed in the chamber.

In some cases, when cutting material such as paper, timber or cloth it may be desirable additionally to direct a jet of finely divided water on to the workpiece in the region of the cut. This assists in preventing charring of the edges of the workpiece adjacent the cut and also reduces the amount of fumes and debris which have to be removed. Although the water jet should be directed at the region of the cut, it does not have to be localized to the extent that would be required for a gas stream in the absence of a suction chamber.

It will be seen that the method according to the invention prevents the products of distillation (with workpieces such as timber, cloth and paper) from rising through the cut and therefore prevents the deposition of these substances on to the margin of the top surface adjacent the cut. It is also found that they are not deposited on the margin of the bottom surface adjacent the cut. It also prevents contamination of the atmosphere above the cut and flattens the material, if flexible, against the support. The support should be arranged to provide the minimum obstruction to the beam and the maximum flow of gas. The suction chamber should be arranged to prevent excessive back reflection of the laser beam from the firebrick or other base layer.

The invention is particularly advantageous for fine cutting with a well focused laser beam when the cutting action requires a gas which reacts exothermically with the workpiece. For fine cuts, it may be difficult to force the exothermic gas down into the cut but an oxygen flow can be achieved more easily if a hood or pot above the cut is flooded with oxygen, as in FIG. 3, and the oxygen is sucked through the cut.

I claim:

1. A method of cutting a workpiece along a predetermined path, comprising the steps of: directing a laser beam through a gaseous medium at the surface of a chamber and aligning said beam with an opening in the chamber surface; locating the workpiece so that the part to be cut is adjacent to said chamber, between and in the path of the laser beam and the opening in the chamber surface; connecting a vacuum pumping means to an outlet port in said chamber, the sole inlet to said chamber during cutting being said opening in said surface adjacent to the workpiece; and relatively moving the workpiece and laser beam to cause the intersection of the laser beam and the workpiece to follow a path to be cut on the workpiece, the gaseous medium being drawn through the cut and the said opening into the said chamber.

2. A method in accordance with claim 1, in which the workpiece and suction chamber are stationary and the laser beam moves with respect to the workpiece and suction chamber, and in which the stationary workpiece is supported by a side of the suction chamber containing the said opening, the said side being in the form of a grid.

3. A method in accordance with claim 1, in which the workpiece and suction chamber are stationary and the laser beam moves with respect to the workpiece and suction chamber, and in which the suction chamber includes one side which serves as a support for the workpiece during the said movement, the said side being formed with a slot extending along the required line of cut.

4. Apparatus for cutting a workpiece, comprising:
    a chamber having a surface for supporting the workpiece, at least a portion of said surface being in the form of a grid;
    a laser;
    means for directing a beam of coherent radiation from the laser through a gaseous medium to a workpiece placed on said grid surface of said chamber and focusing said beam at said workpiece;
    a layer of refractory material located in the path of said laser beam within said chamber;
    pumping means for establishing in said chamber a pressure substantially less than the pressure of said gaseous medium on the side of said workpiece remote from said chamber;
    and means effecting relative movement of said workpiece and said focused laser beam;
    whereby during such relative movement the laser beam cuts the workpiece along a line overlying said grid-supporting surface and the gaseous medium is drawn through the cut and grid surface into the said chamber.

5. A method in accordance with claim 1, further comprising creating on the side of the workpiece on which the laser is located and around the point of the workpiece at which the laser beam is directed an atmosphere of a gas which is so selected in relation to the material of the workpiece that the gas reacts exothermically with the workpiece, whereby when the cut is commenced the said gas is drawn through the cut into the said chamber and reacts exothermically with the workpiece in passing through the latter.

6. A method in accordance with claim 5, in which the workpiece is of metal and in which, prior to a cutting operation, a buffer layer of nonmetallic material is placed between the metal workpiece and the said chamber.

7. Apparatus for cutting a workpiece, comprising:
    a chamber having an aperture in its upper surface;
    a layer of refractory material located within said chamber at the base of said chamber;
    a laser;
    means for directing a beam of coherent radiation from said laser through a gaseous medium to a point on said workpiece located above the aperture in the said upper surface of said chamber, said laser beam and aperture being aligned with said refractory material in the base of said chamber;
    a coiled pipe surrounding said chamber for carrying a liquid coolant to remove heat from said chamber;

pumping means for establishing within said chamber a pressure substantially less than the pressure of said gaseous medium on the side of the workpiece remote from said chamber;

and means effecting relative movement of said workpiece, on the one hand, and said chamber and laser beam, on the other hand, whereby during such relative movement the laser beam cuts the workpiece and then the gaseous medium is drawn through the cut and aperture into said chamber.

8. Apparatus for cutting a workpiece, comprising:

a chamber having an apertured surface for supporting the workpiece, said chamber having a layer of refractory material at its base;

a hood located over said apertured surface on the side of said surface remote from said chamber;

a laser;

means for directing a beam of coherent radiation from said laser through said hood on to a workpiece supported by said surface and focusing said laser beam at said workpiece;

means establishing within said hood an atmosphere of a gas exothermically reactive with said workpiece;

pumping means for establishing within said chamber a pressure substantially less than the pressure of said exothermically reactive gas within said hood;

and means effecting relative movement of said workpiece and said focused laser beam, whereby during such relative movement the laser beam cuts the workpiece and the exothermically reactive gas is drawn through the cut in the workpiece and through the apertured surface into the said chamber.

9. Apparatus for cutting a workpiece comprising:

a laser, a rotary member having its interior separated into segments and having an opening extending around its periphery;

means for directing a beam of coherent radiation from said laser through a gaseous medium towards the opening at a point in the periphery of said rotary member;

means for rotating said rotary member to bring the peripheral surface of each segment in turn into the path of the laser beam;

a vacuum-pumping device and stationary means for connecting said vacuum-pumping device to each segment in turn of said rotary member as it rotates, whereby a partial vacuum is established in each segment in turn as it approaches its intersection with the laser beam path;

a layer of refractory material located in the base of each segment of said chamber;

whereby when a workpiece is supported at the periphery of said chamber between said laser beam and said chamber and the beam cuts the workpiece along a line overlying the opening in said chamber periphery, the gaseous medium is drawn through the cut and the opening into the underlying segment of said chamber.